Feb. 14, 1956 R. MERCER 2,734,946

CIRCUIT ARRANGEMENTS FOR USE IN TELECOMMUNICATION SYSTEMS

Filed March 25, 1952 16 Sheets-Sheet 1

INVENTOR
Richard Mercer
BY
Lippincott & Smith.
ATTORNEYS

Feb. 14, 1956 R. MERCER 2,734,946

CIRCUIT ARRANGEMENTS FOR USE IN TELECOMMUNICATION SYSTEMS

Filed March 25, 1952 16 Sheets-Sheet 2

INVENTOR
Richard Mercer
BY
Lippincott & Smith.
ATTORNEYS

Feb. 14, 1956 R. MERCER 2,734,946

CIRCUIT ARRANGEMENTS FOR USE IN TELECOMMUNICATION SYSTEMS

Filed March 25, 1952 16 Sheets-Sheet 3

INVENTOR
Richard Mercer
BY
Lippincott & Smith
ATTORNEYS

INVENTOR
Richard Mercer
BY
Lippincott & Smith
ATTORNEYS

Feb. 14, 1956 R. MERCER 2,734,946

CIRCUIT ARRANGEMENTS FOR USE IN TELECOMMUNICATION SYSTEMS

Filed March 25, 1952 16 Sheets-Sheet 5

INVENTOR
Richard Mercer
BY
Lippincott & Smith
ATTORNEYS

Feb. 14, 1956 R. MERCER 2,734,946

CIRCUIT ARRANGEMENTS FOR USE IN TELECOMMUNICATION SYSTEMS

Filed March 25, 1952 16 Sheets-Sheet 6

INVENTOR
Richard Mercer
BY
Lippincott & Smith
ATTORNEYS

Feb. 14, 1956 R. MERCER 2,734,946

CIRCUIT ARRANGEMENTS FOR USE IN TELECOMMUNICATION SYSTEMS

Filed March 25, 1952 16 Sheets-Sheet 7

INVENTOR
Richard Mercer
BY
Lippincott & Smith
ATTORNEYS

Feb. 14, 1956 R. MERCER 2,734,946

CIRCUIT ARRANGEMENTS FOR USE IN TELECOMMUNICATION SYSTEMS

Filed March 25, 1952 16 Sheets-Sheet 8

INVENTOR
Richard Mercer
BY
Lippincott & Smith
ATTORNEYS

Feb. 14, 1956 R. MERCER 2,734,946

CIRCUIT ARRANGEMENTS FOR USE IN TELECOMMUNICATION SYSTEMS

Filed March 25, 1952 16 Sheets-Sheet 9

INVENTOR
Richard Mercer
BY
Lippincott & Smith
ATTORNEYS

Feb. 14, 1956 R. MERCER 2,734,946

CIRCUIT ARRANGEMENTS FOR USE IN TELECOMMUNICATION SYSTEMS

Filed March 25, 1952 16 Sheets-Sheet 10

INVENTOR
Richard Mercer
BY
Lippincott & Smith
ATTORNEYS

INVENTOR
Richard Mercer
BY
Lippincott & Smith
ATTORNEYS

Feb. 14, 1956 R. MERCER 2,734,946

CIRCUIT ARRANGEMENTS FOR USE IN TELECOMMUNICATION SYSTEMS

Filed March 25, 1952 16 Sheets-Sheet 12

INVENTOR
Richard Mercer
BY
Lippincott & Smith
ATTORNEYS

INVENTOR
Richard Mercer
BY
Lippincott & Smith
ATTORNEYS

Feb. 14, 1956 R. MERCER 2,734,946

CIRCUIT ARRANGEMENTS FOR USE IN TELECOMMUNICATION SYSTEMS

Filed March 25, 1952 16 Sheets-Sheet 14

INVENTOR
Richard Mercer
BY Lippincott & Smith
ATTORNEYS

CIRCUIT ARRANGEMENTS FOR USE IN TELECOMMUNICATION SYSTEMS

Filed March 25, 1952 16 Sheets-Sheet 15

| | | | |
|---|---|---|---|
| FIG. 5 | FIG. 6 | FIG. 7 | FIG. 8 |
| FIG. 9 | FIG. 10 | FIG. 11 | FIG. 12 |
| FIG. 13 | FIG. 14 | FIG. 15 | FIG. 16 |

| | |
|---|---|
| FIG. 1 | FIG. 2 |
| FIG. 3 | FIG. 4 |

INVENTOR
Richard Mercer
BY
Lippincott & Smith
ATTORNEYS

Feb. 14, 1956 R. MERCER 2,734,946

CIRCUIT ARRANGEMENTS FOR USE IN TELECOMMUNICATION SYSTEMS

Filed March 25, 1952 16 Sheets-Sheet 16

INVENTOR
Richard Mercer
BY Lippincott & Smith
ATTORNEYS

United States Patent Office 2,734,946

Patented Feb. 14, 1956

2,734,946

CIRCUIT ARRANGEMENTS FOR USE IN TELECOMMUNICATION SYSTEMS

Richard Mercer, London, England

Application March 25, 1952, Serial No. 278,344

Claims priority, application Great Britain April 3, 1951

9 Claims. (Cl. 179—18)

Figure 1:
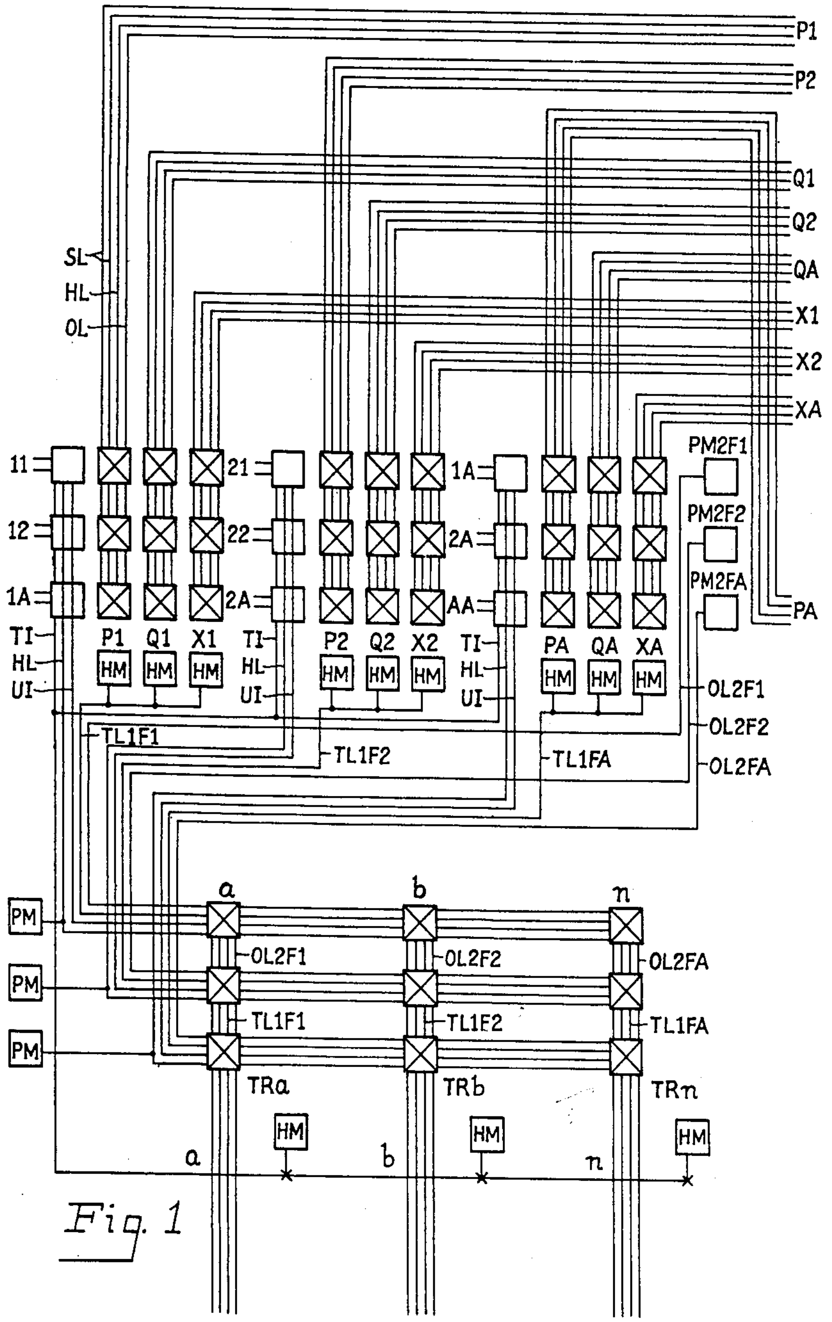
Figure 2:
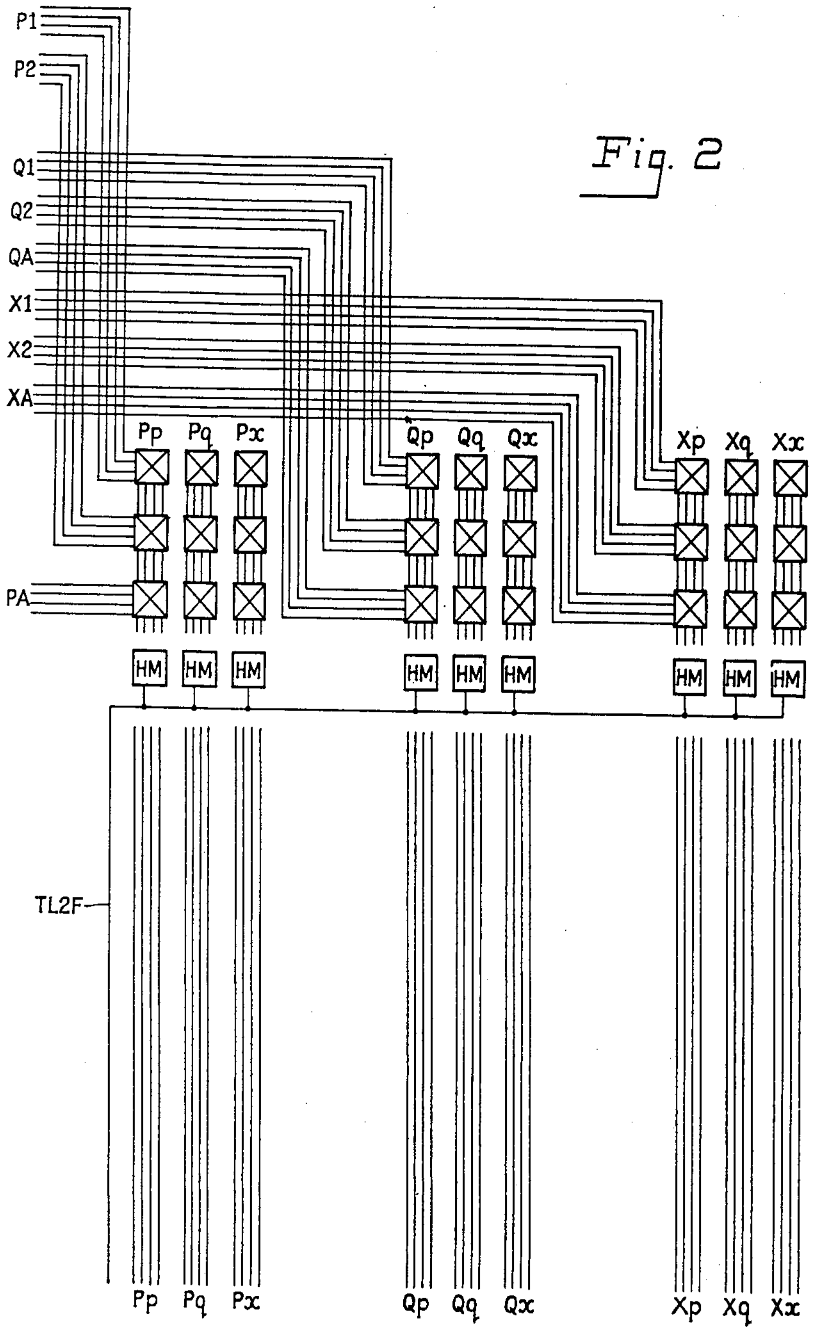
Figure 3:
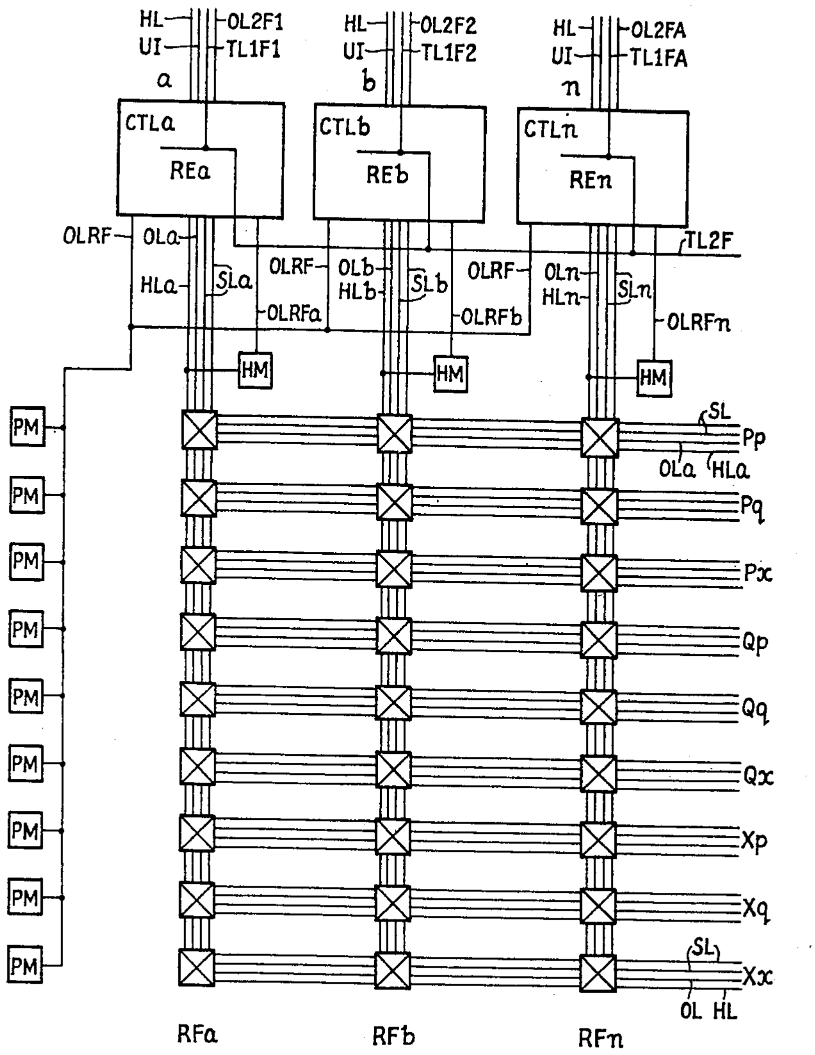
Figure 4:
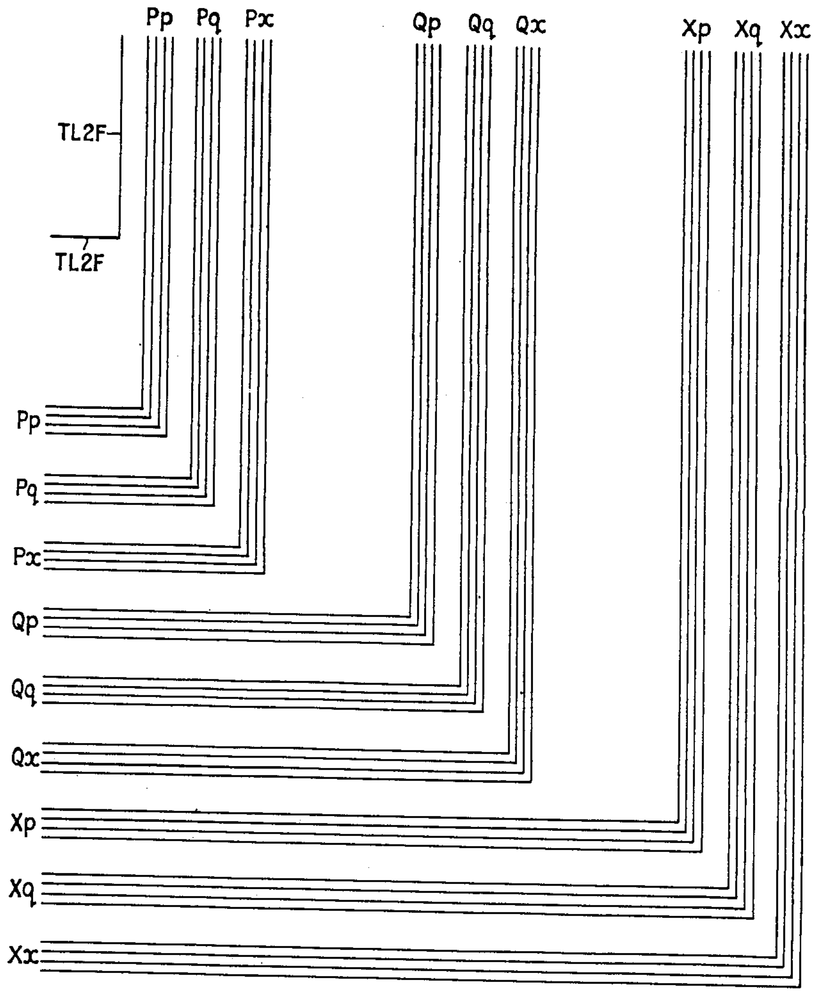

The present invention relates to circuit arrangements for use in telecommunication systems and is more particularly concerned with circuit arrangements for operating finder switches which may conveniently, but not necessarily, take the form of crossbar switches.

One of the objects of the present invention is to improve the operation of finder switches and the connection of a register to a calling line. The invention is of particular application where it is desirable later to set up a connection from a calling line to a called line which may be over a different route from that used for connecting a calling line to a register.

Broadly the invention consists of control equipment which ascertains the identity of the calling line with respect to the finder switch contacts and subsequently tests for an available route between the calling line and impulse responding equipment and controls the connecting of the calling line to the register.

According to one feature of the invention a switching arrangement in a telecommunication or like system employing primary and secondary finder switches to establish connection with a calling line is adapted on initiation of a call from a line to which a group of primary finder switches have access to cause an idle control equipment common to a group of secondary finder switches to be taken into use to register the identity of the group to which the calling line belongs and to enable the identity of the calling line in the group to be identified and subsequently in accordance with the registration of the first identity to select a route including an idle secondary finder having access to an idle primary finder which has access to the calling line and thereafter to control respectively the operation of the secondary finder and the primary finder in the selected route in accordance with the identities of the group to which the calling line belongs and of the calling line in the group.

According to another feature of the invention the switching arrangement for use in telecommunication or like systems comprises trains of finder switches by which a group of calling lines are given access to impulse responding equipment in which on the initiation of a call on one of said lines, the selection of an idle control equipment is effected by which switches capable of giving access to the impulse responding equipment from the calling line are tested for availability and by which the operation of a set of switches found available which give such access is effected.

Conveniently use is made of crossbar switches which are cyclically controlled and in which the prepare magnets are connected to a common circuit which is made effective at a particular instant in the cycle corresponding to the instant at which operating potential is applied to a hold magnet each prepare magnet being controlled to operate at a distinctive instant in the cycle.

The invention also lends itself to the use of crossbar switches in which the prepare magnets are all adapted to be operated at instants in a cycle, but the particular instant in a cycle at which a prepare magnet is operated is determined by the same control which determines the instant at which the hold magnet is operated, so that neither the hold magnet nor the prepare magnet need be individually controlled to operate at a predetermined instant in a cycle.

Figures 15, 17, 18:
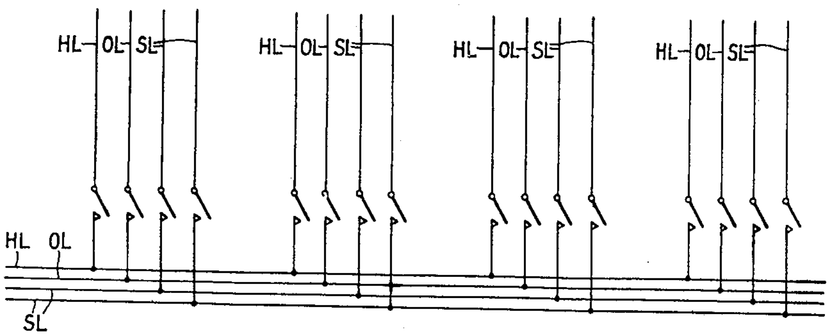
Figure 16:
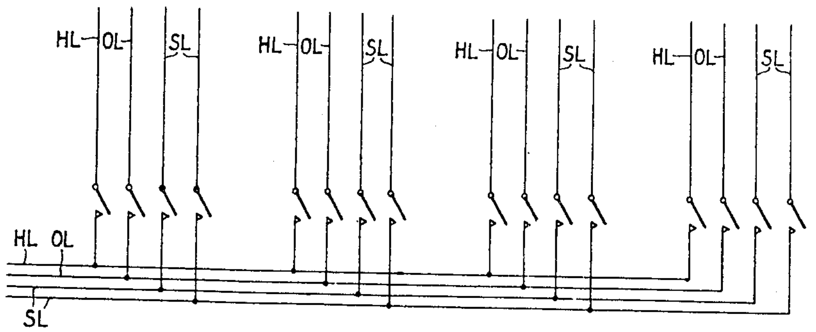
Figure 19:
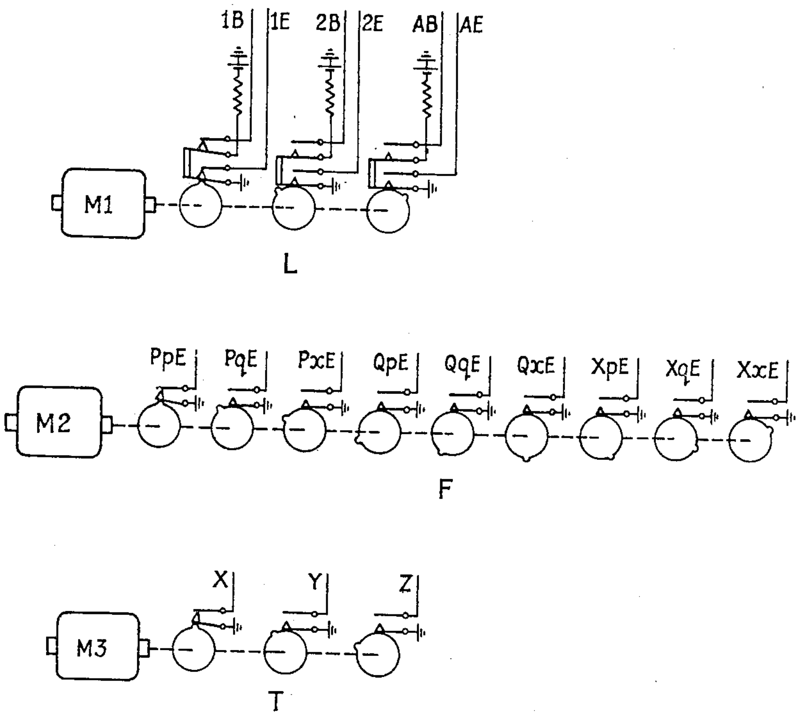

The invention will be better understood from the following description of one embodiment taken in conjunction with the accompanying drawings comprising Figs. 1–18 of which Figs. 1 to 4 when arranged as indicated in Fig. 17, show schematically the arrangement of primary and secondary finder switches according to the invention while Figs. 5 to 16 when arranged as indicated in Fig. 18 show the detailed circuits of the arrangement.

A description will first be given of the schematic arrangement shown in Figs. 1 to 4 and will be followed by a detailed description of the circuit operations with reference to Figs. 5 to 16. Referring to Figs. 1 to 4, three groups of lines 11 to 1A, 21 to 2A and A1 to AA are shown, each group being accessible to a group of primary finder switches. Thus lines 11 to 1A are accessible to primary finders P1, Q1 and X1; lines 21 to 2A are accessible to finders P2, Q2 and X2 while lines A1 to AA are accessible to finders PA, QA and XA. Groups of secondary finder switches are also shown of which P*p*, P*q* and P*x* have access in common to the primary finders P1, P2 and PA: Q*p*, Q*q* and Q*x* have access in common to the primary finders Q1, Q2 and QA while X*p*, X*q* and X*x* have access in common to the primary finders X1, X2 and XA. The outlets from the primary and secondary finders consist of two speaking leads SL, a hold lead HL and an operate lead OL.

A number of impulse responders *a*, *b* and *n* are provided in common to all the primary and secondary finders i. e. in common to all the lines 11 to AA. The impulse responders are not shown in detail since a description of all their functions is unnecessary for an understanding of the present invention. Those parts of the impulse responder which are shown comprise a register, such as TR*a*, TR*b* or TR*n* for registering the tens digit of a calling line; a route finder RF*a*, RF*b* or RF*n* and relay equipment RE*a*, RE*b* or RE*n*, the latter comprising line, release and other relays.

The number of primary finders in each group and the number of secondary finders in each group may be varied as desired to suit traffic requirements and while three only have been shown, it will be understood that this is purely for convenience of description. A suitable number of primary finders having access to a group of 10 lines might, for instance, be five while the number of secondary finders accessible to a primary finder of each group of 10 lines in a total of 100 lines may be four, making 20 secondary finders per 100 lines. Further 5 impulse responders may be provided per group of 100 lines but it will be understood that these numbers are given purely by way of example.

Each of the groups of primary and secondary finders consist of cross-bar switches and in Figs. 1 to 4 the squares with diagonals inserted represent a set of contacts in a cross-bar switch. The squares without the diagonals adjacent the primary finders for lines 11–1A represent line and cut-off relays and the prepare magnets of the cross-bar switch. Since all the primary finders for a group of 100 lines can be accommodated on a single cross-bar switch, the squares without diagonals adjacent the remaining groups of lines represent line and cut-off relays only. The remaining squares without diagonals represent the various prepare magnets of the cross-bar switches included in the tens registers and route finders.

A description will now be given of the operation of the arrangement, first with reference to Figs. 1 to 4 and subsequently with reference to Figs. 5–16. Referring to Figs. 1 to 4, when a subscriber, such as subscriber 11 lifts his receiver, the line relay operates and connects direct earth to the hold lead HL and connects up leads TI and UI. Earth is applied to each of leads TI and UI at an instant in a cycle which identifies the tens and units digits respectively of the line. In the selected example, earth will be connected to both leads at the same instant 1 in the cycle. Leads HL and UI are common to a group of A calling lines, such as the group 11 to 1A, or 21 to 2A or A1 to AA while the lead TI is common to a group of A2 lines such as lines 11 to AA.

Earth applied to the hold lead HL is extended to one terminal of the winding of a prepare magnet of the cross-bar switch forming the tens registers, the particular prepare magnet corresponding to the tens digit 1. The other terminal of the winding is connected to a lead to which battery is applied at instant 1 of a cycle. The tens lead TI is extended to an available hold magnet of the tens register cross-bar switch so that at instant 1 of the cycle, the prepare magnet operates followed by the hold magnet. Assuming that the impulse responder *a* is idle, then the upper set of contacts of TR*a* will be operated corresponding to the value of the tens digit of the calling line.

The next operation is the selection of an available route to the calling line over the primary and secondary finders and for this purpose each of the relay equipments RE*a*, RE*b* and RE*n* which are permanently connected to the tens registers TR*a*, TR*b* and TR*n* respectively, is provided with a common test lead CTL*a*, CTL*b* and CTL*n*. Test lead TL2F is connected to all the common test leads CTL*a*, CTL*b*, CTL*n* while test leads TL1F*a*, TL1F*b* and TL1F*n* are connected individually to the common test leads CTL*a*, CTL*b* and CTL*n* respectively, and are adapted to be connected to a selected one of the test leads TL1F1, TL1F2 and TL1FA depending on the tens digit of the calling line. The test leads TL1F1, TL1F2 and TL1FA extend through the tens register in common to groups of primary finders which have access to groups of 10 lines having the tens digit equal to 1, 2 or A respectively. These test leads are adapted to have earth connected to them at instants in a cycle distinctive of the primary finders having access to the various groups of ten lines (1, 2 and A) which are busy. The test lead TL2F extends directly to the secondary finders and is adapted to have earth connected to it at instants in a cycle corresponding to those secondary finders P*p* to X*x* which are unavailable. In the present instance test lead TL1F1 will be earthed at the appropriate instant if any of the primary finders P1, Q1 and X1 are busy.

It is to be noted that if a primary finder is busy, all the secondary finders having access to such primary finders must be indicated as being unavailable and this is effected by causing earth to be applied to the appropriate test lead at instants corresponding to each of the secondary finders having access to such busy primary finder. In the particular example, if primary finder P1 is busy, lead TL2F will have earth connected to it at instants P*p*, P*q* and P*x* in a cycle corresponding to secondary finders P*p*, P*q* and P*x*.

It should be explained that the test leads are connected to the common test lead or leads through unidirectional resistors in order to prevent earth applied to one lead being fed to another lead.

When an impulse responder is taken into use, earth through a guarding battery is applied to the common test lead of the impulse responder to initiate testing and at the instant in a cycle when no earth is connected to the common test lead by the primary and secondary finder test leads, a relay operates or releases for that instant corresponding to the available route and serves to connect up operate lead OLRF, one of the operate leads OLRF*a*, OLRF*b* or OLRF*n* and one of the operate leads OL2F1, OL2F2 or OL2FA. The connection of these leads serves to operate over OLRF the prepare magnet of the appropriate route finder, which magnet characterises the route selected and the hold magnet over OLRF*a*, OLRF*b* or OLRF*n*, to take into use the selected secondary finder and to operate temporarily over one OL2F1, OL2F2 or OL2FA the prepare magnet of the selected secondary finder corresponding to the tens digit of the calling line.

In the present case it will be assumed that the test shows that the primary finder P1 and the secondary finder P*p* are both available, that is to say that no earth is connected to lead CTL*a* at instant P*p* in the cycle whereupon during the same instant the prepare magnet of the route finder RF*a* which corresponds to the secondary finder P*p* is operated over lead OLRF followed by the hold magnet of RF*a* over lead OLRF*a*. The hold magnet locks to the hold lead extending from the lines 11 to 1A. Further over lead OL2F*a* the tens register and lead OL2F1 the prepare magnet of the secondary finder P*p* corresponding to the tens digit 1 is operated. When RF*a* is operated, the hold lead HL*a* is extended to the hold magnet of the secondary finder P*p* which thereupon operates and the connection is thus extended from RE*a* through RF*a* to the secondary finder P*p* and thence to the idle primary finder P1 of the groups having access to lines whose tens digit is 1. The units lead UI is connected to operate lead OL*a* on the operation of TR*a* and this is now extended over the same route to the primary finder P1 and serves to operate the appropriate prepare and holding magnets of P1 over a parallel circuit. It should be explained that the prepare magnets are connected in parallel to this circuit and the circuits of the prepare magnets are completed over leads to which battery is applied at different instants in the cycle corresponding to the value of the units digit. As previously explained earth is also adapted to be applied to the units lead UI at instants of a cycle characterising the units digit of the calling line so that the operation of the particular prepare magnet to cause the connecting up of the calling line is ensured. The cut-off relay of line 11 is operated on the operation of the hold magnet P1 and the selected set of contacts giving access to line 11.

The calling line is thus connected over P1, P*p* to the impulse responder *a* whereupon a lone relay in RE*a* operates followed by a release relay. The release relay in operating supplies an earth for maintaining the hold magnets of RF*a* and TR*a* and connects earth independently of the hold lead of RE*a* to maintain the hold magnets of P*p* and P1. Further the tens digit of the calling subscriber is stored on the tens register TR*a* and this may be used in conjunction with a register for the tens digit and in conjunction with selected lead UI for identification purposes or for setting up the connection from the calling party over another route.

If two calls are made simultaneously from different groups of ten lines of a particular 100 line group, one of the tens registers will be associated with the calling line first depending upon the instant the call is initiated compared with the instants in a cycle assigned to the tens digit of the calling line. Thus if the lines are in groups 11 to 1A and 21 to 2A and the calls are initiated at instant A in a cycle, tens register TR*a* will be associated with the line in group 11 to 1A at instant 1 of the cycle and will then connect up tens register TR*b* which will be associated with the line in group 21 to 2A at instant 2 of the cycle. By this means each tens register will operate at a different instant of time.

If calls from two lines in the same group of ten lines are initiated simultaneously, the tens register of one impulse responder will register the tens digit at the instant of the cycle corresponding to such digit. At the same instant of the next cycle the tens register of another impulse responder will register the same tens digit. The primary finder of the route selected by the first impulse responder will be operated to connect with the line whose units digit corresponds to an instant in the cycle which is nearest in time to the instant at which route selection is completed. Due to the operation of the cut-off relay of that line, the units lead UI will no longer be earthed at the instant corresponding to that line but UI will still be earthed at the instant corresponding to the other line whereby the primary finder in the route selected by the second impulse responder will be operated to connect with such other line.

Provision is also made for ensuring that two route finders cannot seize the same route simultaneously. This is effected by connecting leads to which battery for the testing operation is applied at different instants of the cycle, to separated points in a chain circuit through the armature and back contacts of relays in the route finders, which relays operate when the impulse responders are in readiness for route finding. In operating, the front contacts of the relays connect the battery leads to the common test leads so that the route finder which is nearest to the conductor to which battery is connected when two route finders are ready for operation, operates first and will be followed by the second. As the instant when the route finders become ready for operation is indeterminate, each route finder will have an equal chance of being first. It should be pointed out that if the first route finder does not find a route during the time available, before battery is applied to the chain circuit beyond the first impulse responder, the second impulse responder will have first chance.

Figure 5:
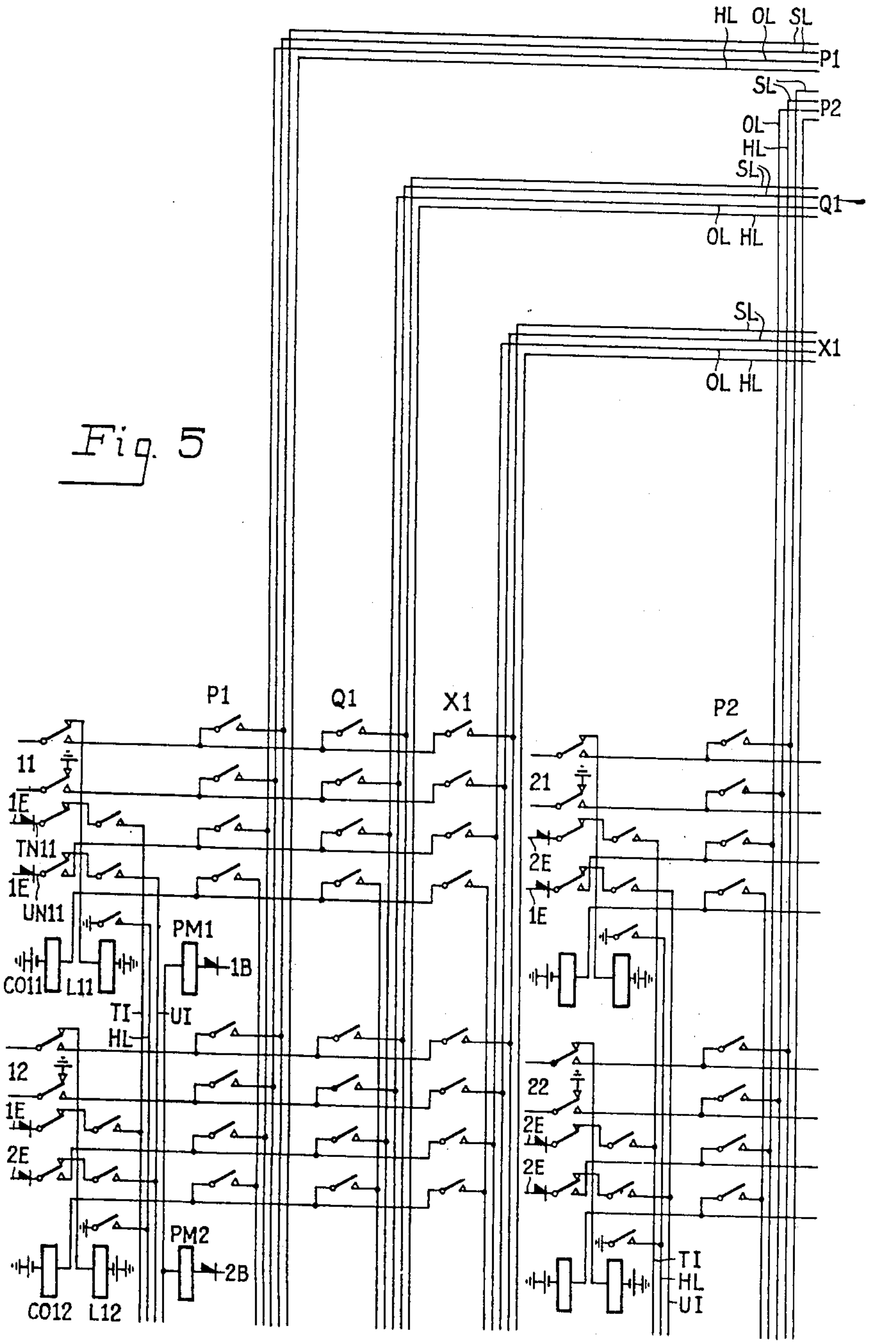
Figure 6:
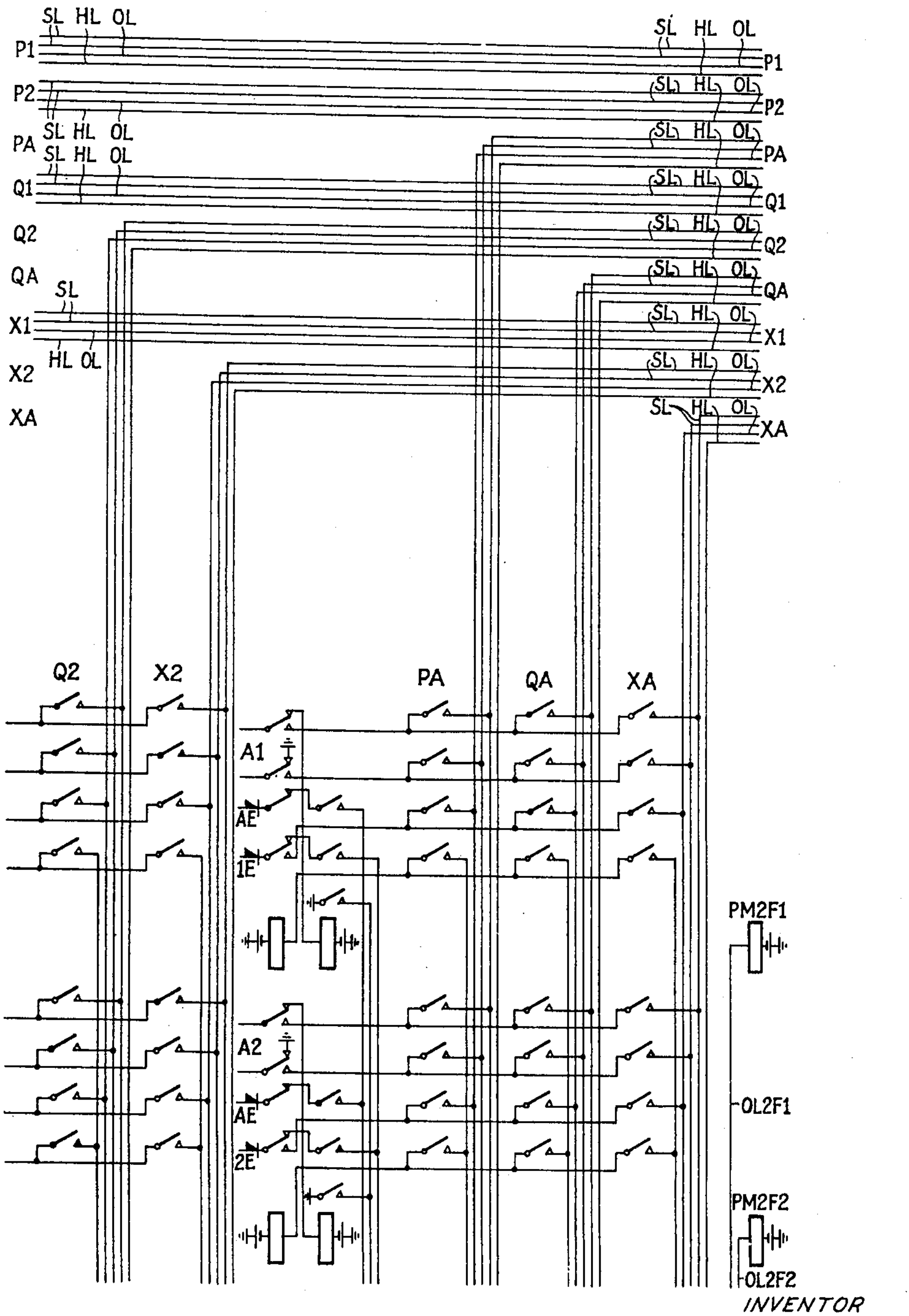
Figure 7:
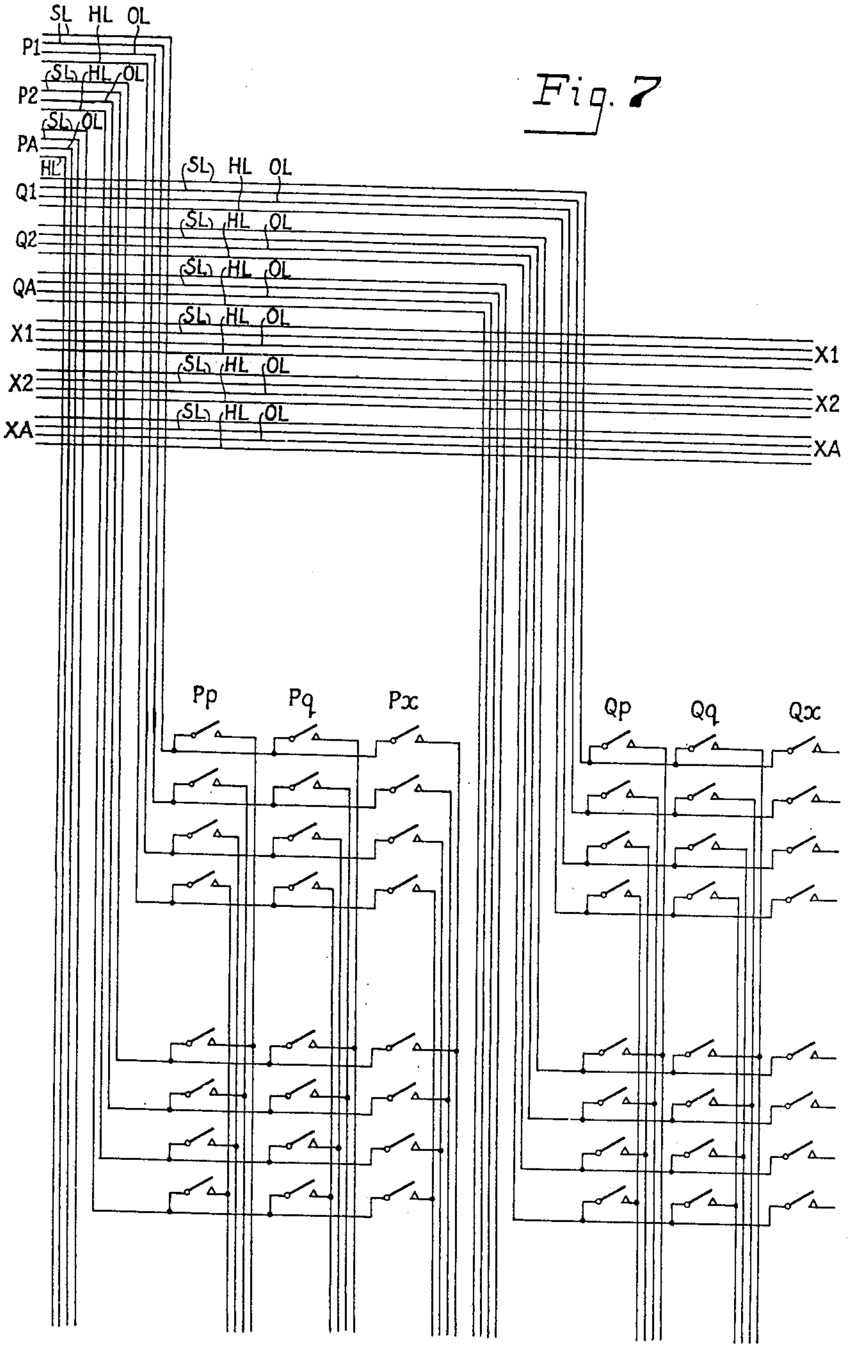
Figure 8:
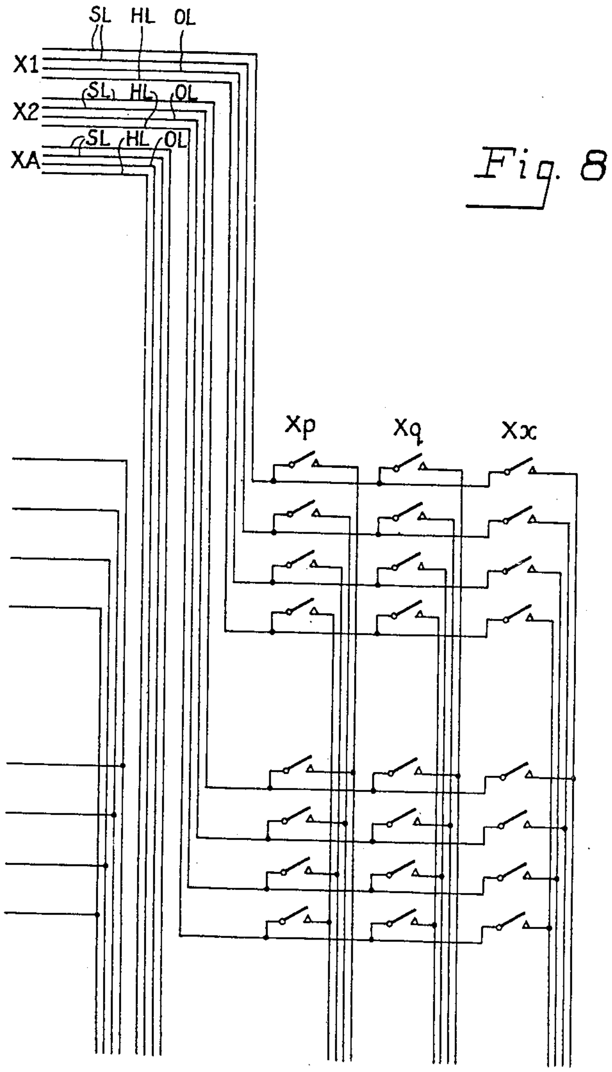
Figure 9:
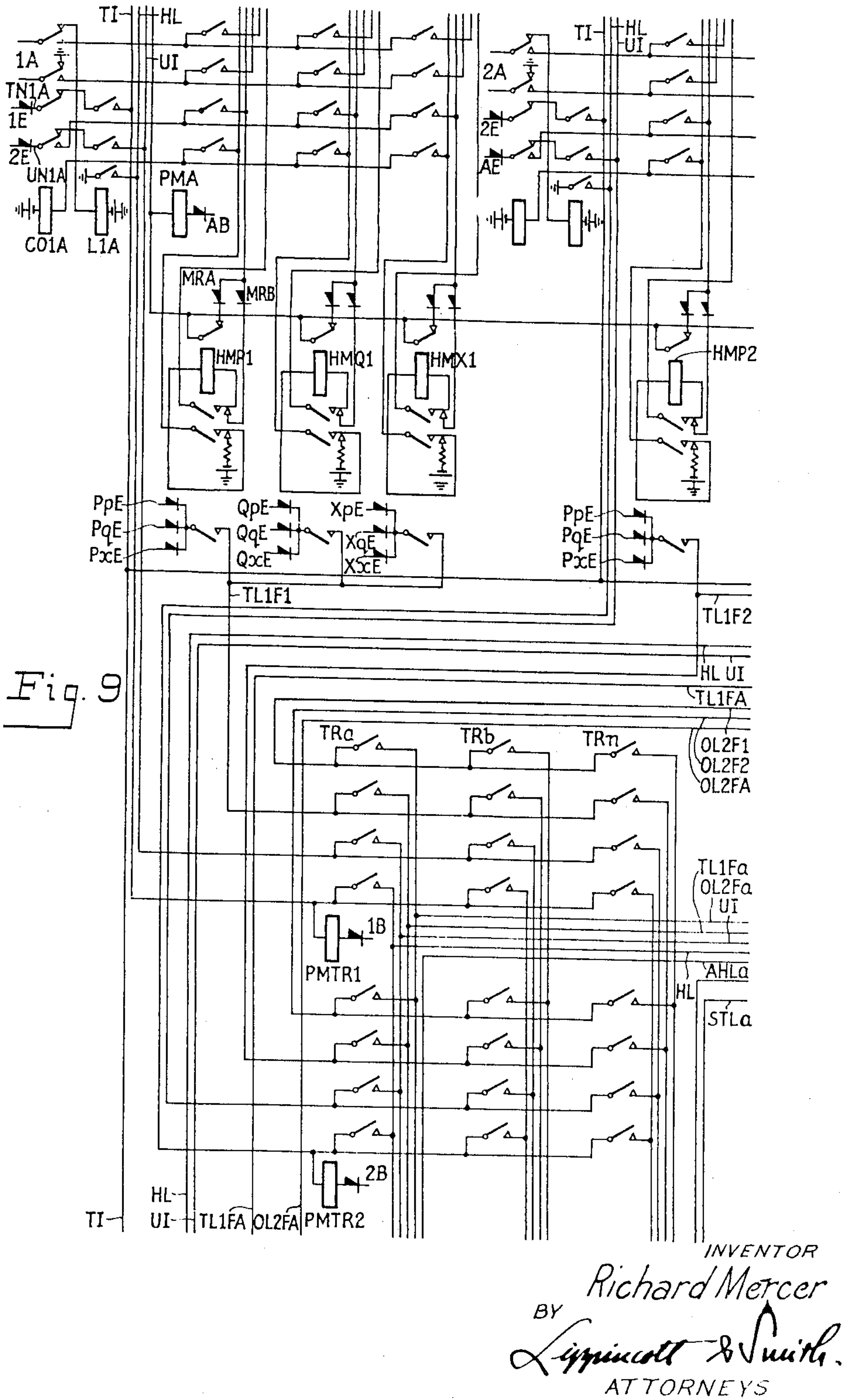

A detailed description will now be given with reference to Figs. 5 to 16 and it will first be assumed that subscriber 11 (Fig. 5) wishes to set up a connection. On lifting his handset, the line is looped and the line relay L11 operates over the loop to earth at the back contacts of cut-off relay CO11. Relay L11 in operating at its inner front contacts earths the hold lead HL and at its middle front contacts connects lead UN11 to the units lead UI. Finally at its outer front contacts relay L11 connects lead TN11 to the tens lead TI. As indicated in Fig. 5 by the reference 1E, earth is applied at instant 1 of a cycle both to lead UN11 and lead TN11, while in addition battery is applied at the same instant to one terminal of prepare magnet PMTR1 (Fig. 9) of the tens register TR*a*. Hence at instant 1 of the cycle, prepare magnet PMTR1 operates to earth on the hold lead HL while substantially simultaneously the following circuit is completed for hold magnet HMTR*a* of the tens register (Fig. 13) earth on lead TN11 at instant 1, back contact of CO11, front contact of L11, lead TI, break contact of relay SW*a*, break contact of hold magnet HMTR*a*, lower winding of HMTR*a* to battery. This earth is also extended over the lower break contact of the hold magnet to battery through the winding of relay SW*a*. The hold magnet and relay SW*a* operate. It will be understood that the operation of prepare magnet PMTR1 and hold magnet HMTR*a* will cause the operation of the upper set of contacts associated with TR*a* whereupon the hold magnet locks over its lower winding and operated contact, through the lower contact of the upper set of contacts of TR*a* to earth on HL. Relay SW*a* in operating disconnects lead TI from the contacts of the hold magnet and connects it to its own winding so that relay SW*a* remains operated as long as earth is connected to lead TI. When earth is disconnected from lead TI, relay SW releases and lead TI is then connected over operated contacts of the hold magnet HMTR*a* to hold magnet HMTR*b* and relay SW*b*. It will be noted that the closing of the inner front contacts of the hold magnet HMTR*a* would in the absence of relay SW*a* extend lead TI to hold magnet HMTR*b* or to a subsequent hold magnet if HMTR*b* is operated and there would thus be a possibility that earth would be applied to this lead for a sufficient length of time during instant 1 to cause the operation of hold magnet HMTR*b*. This is prevented by the provision of relay SW*a*.

Figure 10:
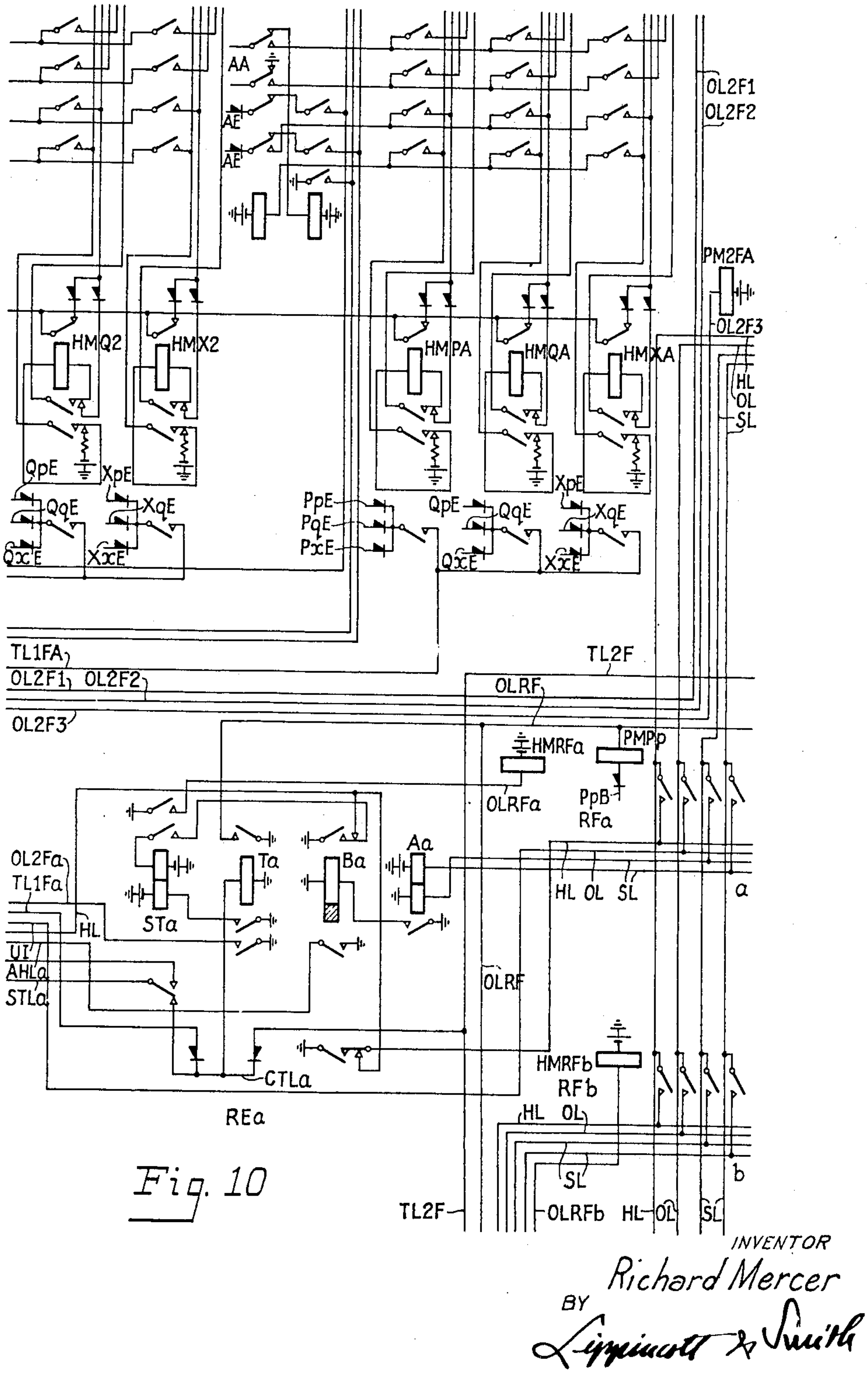
Figure 11:
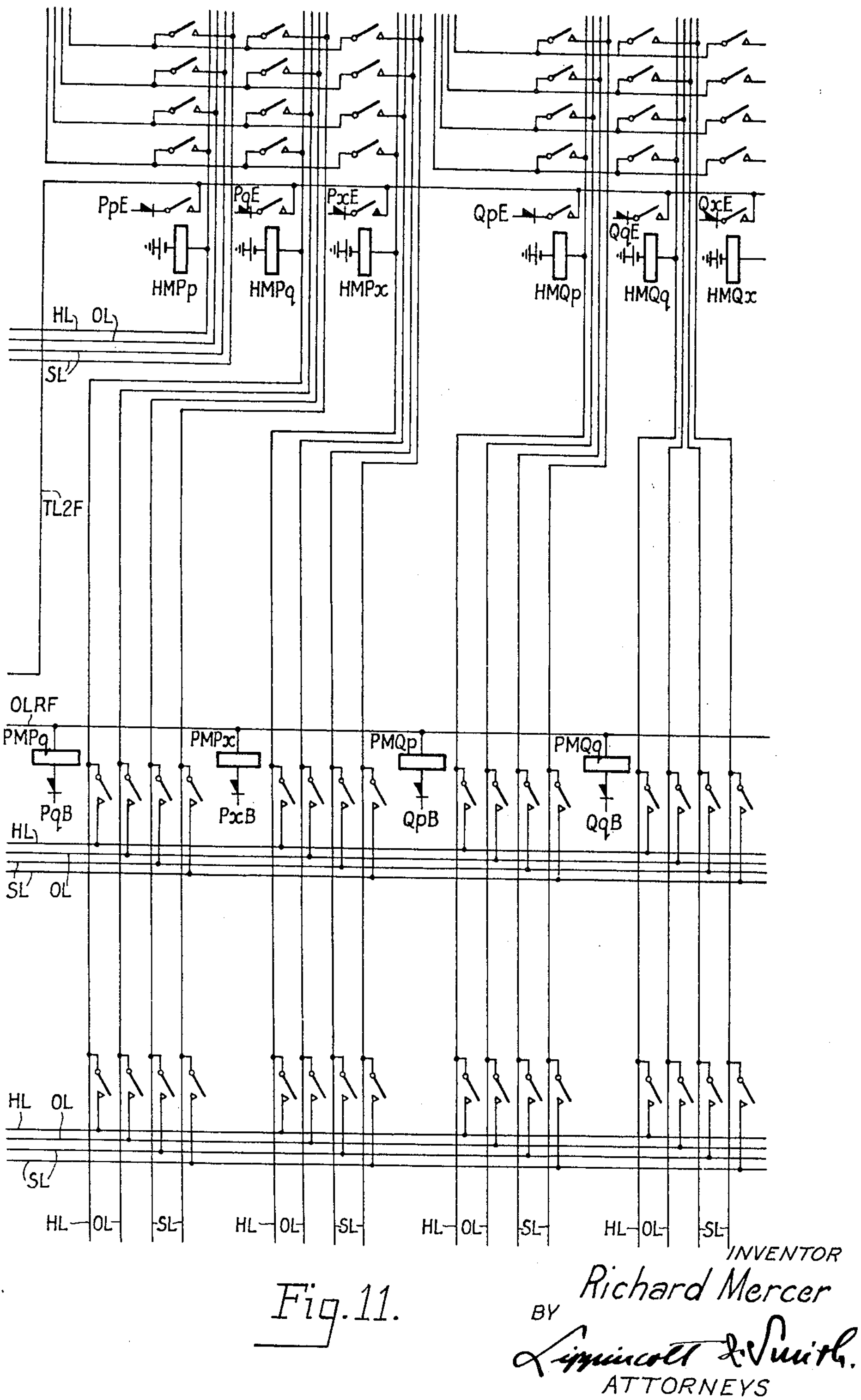
Figure 12:
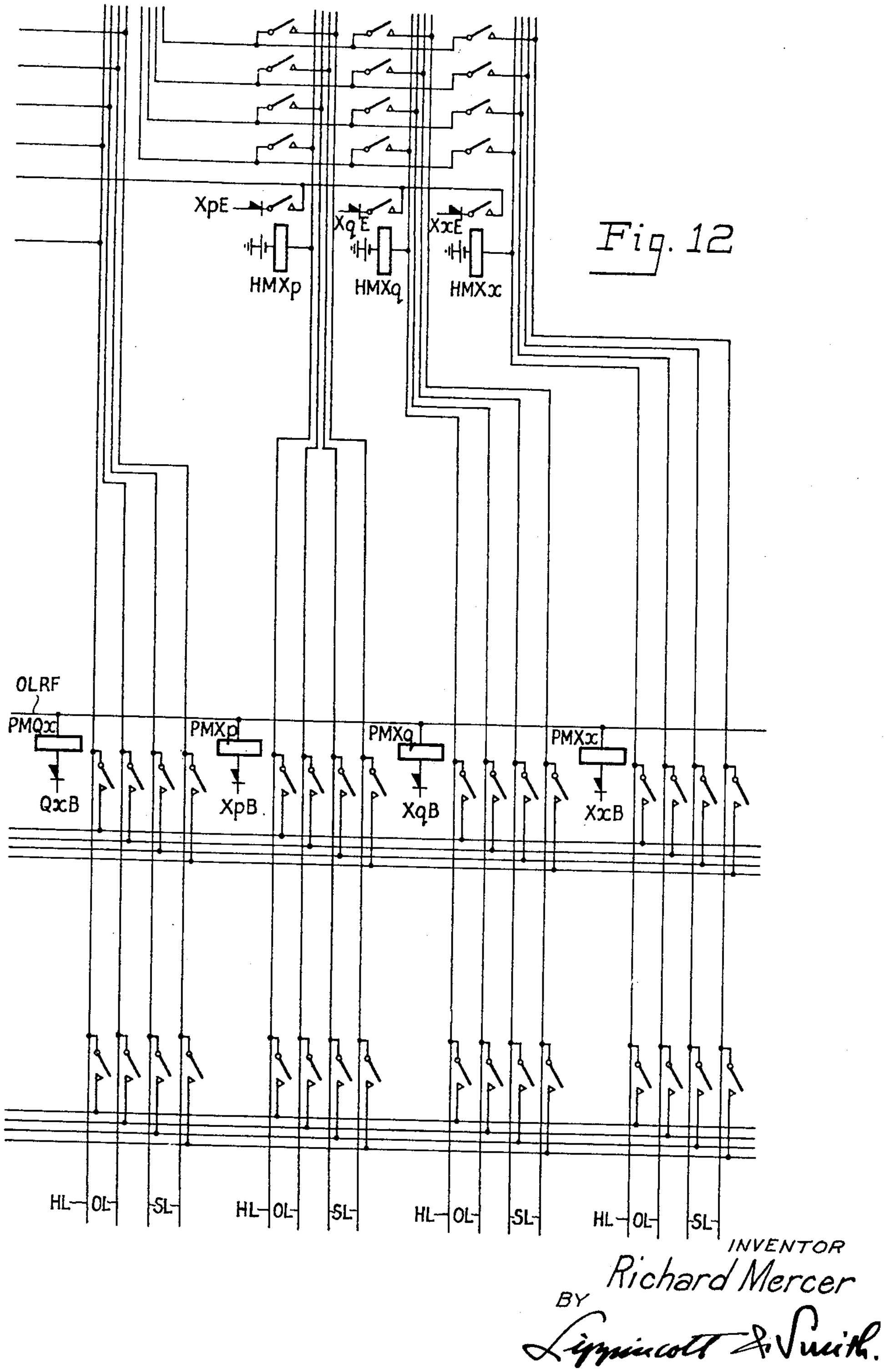

By the operation of the upper set of contacts associated with TR*a* as described above, impulse responder *a* is taken into use and the operation of the upper set of contacts also serves to register the tens digit of the calling line. As regards the units digit, the lead UI is extended over one of the contacts of the upper set to the relay equipment RE*a* (Fig. 10).

The above operations take place at instant 1 of the cycle after the lifting of the calling party's receiver. The next operation is to determine which of the primary and secondary finders having access to the calling line are available for operation to extend the calling line to subsequent equipment. In order to test for the availability of the primary and secondary finders, RE*a* is provided with a lead CTL*a* (Fig. 10) which is connected over back contacts of start relay ST*a*, lead STL*a*, front contacts of hold magnet HMTR*a* to battery on one of the leads XB, YB or ZB. Battery is connected to leads XB, YB and ZB at distinctive instants in a cycle which may be of a duration greater than the other cycles referred to so that instants X, Y and Z may be of a duration equal to several instants of the cycles P*p* to X*x*. Lead CTL is also connected in common to leads TL1F*a* and TL2F, the former extending over a contact of the upper contact set associated with TR*a* and thence in parallel to contacts of hold magnets HMP1, HMQ1 and HMX1 of the primary finders P1, Q1 and X1, while TL2F extends in parallel to contacts controlled by the hold magnets HMP*p*, HMP*q*, HMP*x*, HMQ*p*, HMQ*q*, HMQ*x*, HMX*p*, HMX*q*, HMX*x* of the secondary finder switches P*p*, P*q*, P*x*, Q*p*, Q*q*, Q*x*, X*p*, X*q* and X*x*. It will be understood that any calling line in the group 11 to 1A may be extended over any one of the group of primary finders P1, Q1 and X1 but the further extension of a calling line in this group and in fact any group may involve any one of the secondary finders P*p*, Q*p*, X*p*, P*q*, Q*q*, X*q*, P*x*, Q*x* and X*x*. It is for this reason that the lead TL1F*a* is extended over operated contacts of TR*a* i. e. to lead TL1F1 in accordance with the tens digit, to the contacts controlled by the hold magnets HMP1, HMQ1 and HMX1 while lead TL2F is extended direct to the hold magnets of all the secondary finders.

Battery may be connected, for instance, to lead XB at an instant in a cycle of a duration sufficient to cover a whole cycle of group testing operations. The cycle of group testing operations comprises a number of distinctive instants during which earth is applied to leads P*p*E, P*q*E, P*x*E, Q*p*E, Q*q*E, Q*x*E, X*p*E, X*q*E and X*x*E successively. The idle or busy condition of the primary and secondary finders is determined by the unoperated or operated condition respectively of the associated hold magnets. If a hold magnet is operated, then earth will be connected at the appropriate instant of the cycle to leads TL1F1, TL1F2 or TL1FA or lead TL2F according as to whether it is a primary or secondary finder which is busy. It will be noted that earth will be connected to lead TL1F1 at instances P*p*, P*q* and P*x* when hold magnet HMP1 is operated, indicating that primary finder P1 is in use while the same leads are connected to lead TL2F individually over operated contacts of hold magnets HMP*p*, HMP*q* and HMP*x* respectively. This is essential since if primary finder P1 is busy, all the secondary finders accessible thereto must be indicated as unavailable. However, in the first place it will be assumed that none of the primary or secondary finders are busy so that no earth will be connected to either of leads TL1F1 or TL2F at instant P*p*. Relay T*a* is thus able to operate to battery supplied over a contact of HMTR*a* and in operating closes a circuit for relay ST*a*. Relay ST*a* operates and locks to the hold lead HL over back contacts of relay B*a*. Also relay T*a*, in operating, connects earth to the two operate leads OL2F*a* and OLRF in order to effect the operation of the route finder RF*a* and the secondary finder P*p*. Thus lead OL2F*a* extends over an operated contact of the upper set associated with TR*a* to lead OL2F1 and thence to battery through prepare magnet PM2F1 associated with the upper contact sets of the secondary finders. Prepare magnet PM2F1 operates. Lead OLRF extends in parallel to all the prepare magnets associated with RF*a*, RF*b* and RF*n* and through the windings of the prepare magnets to leads to which battery is connected at instants P*p*, P*q*, P*x*, Q*p*, Q*q*, Q*x*, X*p*, X*q*, X*x* in a cycle. Since, in the case considered, relay T*a* operates at instant P*p*, prepare magnet PMP*p* will operate to earth at the front contacts of relay T*a*.

As mentioned above the operation of relay T*a* also causes the operation of relay ST*a*. Relay ST*a* extends earth directly to hold magnet HMRF*a* which operates so that the left-hand set of contacts of RF*a* are operated. Leads SL, HL and OL are thus extended through RF*a* to the secondary finder P*p*. In particular lead HL is extended to the winding of hold magnet HMP*p* of P*p* and, prepare magnet PM2F1 having been operated as described above, the upper set of contacts of P*p* are operated and leads SL, HL and OL are extended to the primary finder P1.

It will be seen that relay ST*a* in operating disconnects lead STL*a* from the winding of relay T*a*. Relay T*a* thereupon releases and removes earth from the operate leads OLRF and OL2F*a* and hence from OL2F1.

When leads OL, HL and SL are extended to the primary finder, the following circuit is completed at instant 1 of the next cycle for the prepare magnet PM1: earth on lead UN11, back contacts of CO11, front contacts of L11, lead UI, operated contact of the upper set of TR*a*, lead UI, lead OL, operated contact of the left-hand set of RF*a*, operated contact of the upper set of P*p*, metal rectifier MRA, break contact of hold magnet HMP1, winding of prepare magnet PM1 to battery at instant 1. A branch of this circuit also extends over metal rectifier MRB, break contacts of hold magnet HMP1, winding of HMP1 and break contacts to resistance battery. Prepare magnet PM1 first operates and is followed by hold magnet HMP1 so that the upper set of contacts of P1 are operated. If prepare magnet PM1 is not sufficiently fast, the circuit for HMP1 might be completed by PM1 or HMP1 may be made slow to operate. Hold magnet HMP1 in operating at its make-before-break contacts opens the original circuit for itself and for prepare magnet PM1 and completes a holding circuit for itself in series with the cut-off relay CO11 to earth on the hold lead HL. Relay CO11 operates in this circuit and disconnects the line relay L11 which releases.

The calling line is thus extended over P1 and P*p* to the upper and lower windings of relay A*a* of RE*a*. Relay A*a* operates and closes a circuit for relay B*a*. Relay B*a* in operating provides a local holding circuit for relay ST*a* thereby ensuring that hold magnet HMRF*a* remains operated and connects earth to lead AHL*a* which is connected to the upper winding of hold magnet HMTR*a* so that this magnet is also maintained operated. Finally relay B*a* connects earth to hold lead HL to maintain the cut-off relay CO11 and hold magnet HMP1 in place of the earth originally connected to HL over the operated line relay L11.

It will be understood that the tens digit of the calling line is stored in the impulse responder by the operation of the particular set of contacts operated in the tens digit register. This can be used for identification purposes if required or for setting up the connection over another route in conjunction with a register for the unit digit.

Figure 13:
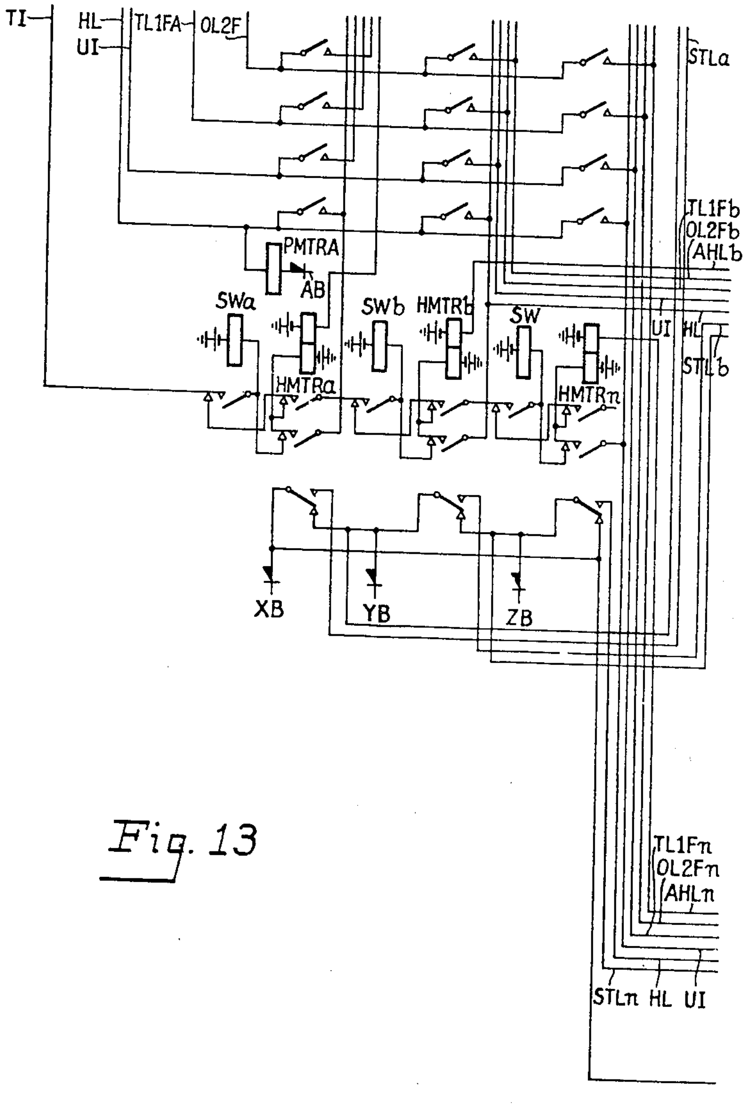
Figure 14:
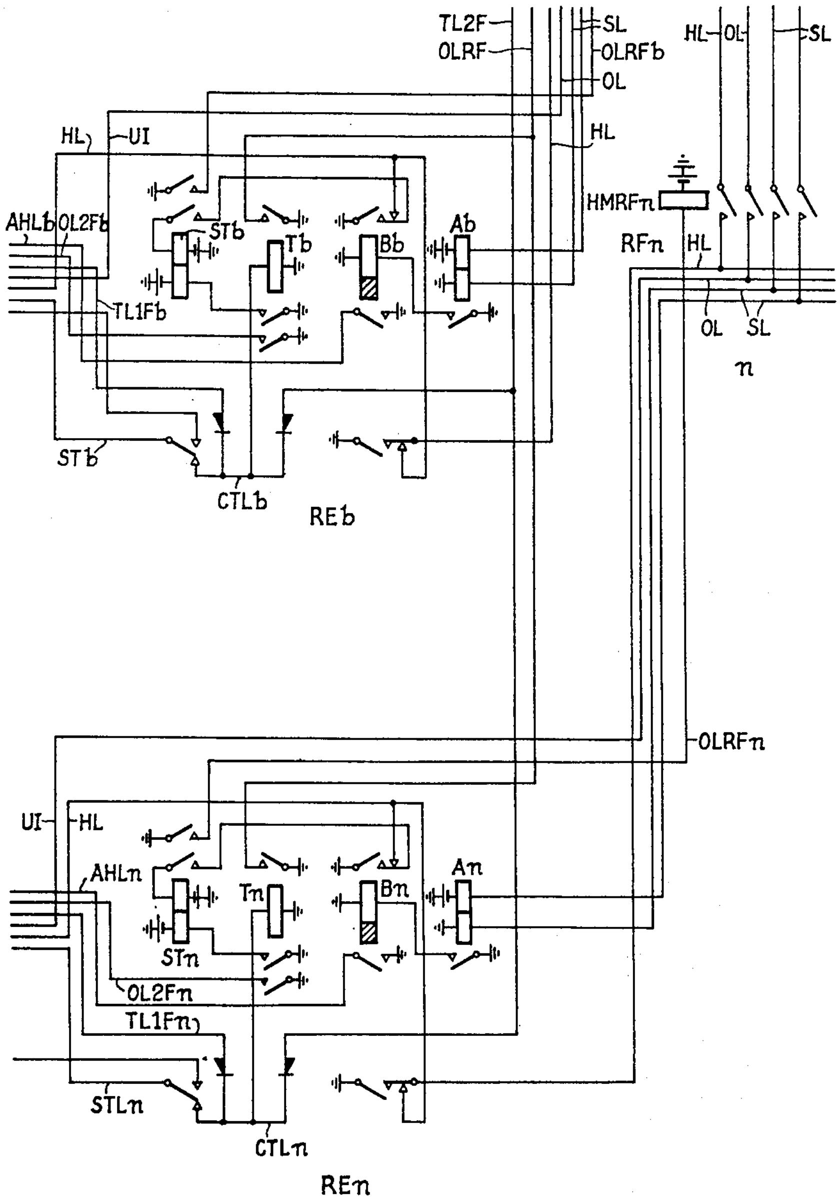

It will now be assumed that while the line 11 is connected over primary finder P1 and secondary finder P*p* to RE*a*, another subscriber in the same group of lines, for example the subscriber on line 1A, lifts his receiver. Line relay L1A operates and connects lead TN1A to load TI and also extends earth to one terminal of PMTR1. As earth is connected to leads TN11, TN12, TN1A at the same instant of time in a cycle to feed a common lead TI, it is possible to replace these leads by a single lead. At instant 1 in a cycle, following the initiation of a call, battery is connected to the other terminal of PMTR1 so that the magnet operates, and earth is extended over TN1A, TI, back contacts of relay SW*a*, front contacts of HMTR*a*, back contacts of relay SW*b*, front contacts of HMTR*b* to battery through the lower winding of HMTR*b*. The hold magnet and SW*b* operate in the same way as hold magnet HMTR*a* and SW*a*. The operation of prepare magnet PMTR1 and hold magnet HMTR*b* causes the operation of the upper set of contacts associated with tens register TR*b*, thereby registering the tens digit of the calling line and extending leads HL and UI to the impulse responder RE*b*. Testing now takes place for an available primary and secondary finder having access to the line 1A and it will be seen that since hold magnet HMP1 is operated, earth will be extended over lead TL1F1 at instants P*p*, P*q* and P*x* in the cycle to prevent the operation of the test relay T*b* at these instants. In addition earth will be connected to lead TL2F at instant P*p* in the cycle since hold magnet HMP*p* of the secondary finder P*p* is operated. At instant Q*p* in the cycle, however, if no earth is connected either to TL1F1 or TL2F, relay T*b* will operate over lead CTLB to battery from one of the leads XB, YB or ZB (Fig. 13). Relay T*b* in operating closes a circuit for ST*b* and also connects earth to the common operate lead OLRF and the individual operate lead OL2F*b* and thence to lead OL2F1 via the tens register. The connection of earth to lead OLRF causes the operation of prepare magnet PMQ*p* at instant Q*p* while hold magnet HMRF*b* is operated by direct earth from relay ST*b* over lead OLRF*b* when this relay operates. The fourth from the left set of contacts of RF*b* are thus operated. The operation of these contacts extends RE*b* through RF*b* to the secondary finder Q*p*. Earth connected to lead OL2F*b* is extended through TR*b* to lead OL2F to cause the operation of prepare magnet PM2F1 while hold magnet HMQ*p* of the secondary finder Q*p* is operated from the hold lead extending from RE*b*. The upper set of contacts of secondary finder Q*p* are thus operated and leads SL, HL and OL from RE*b* are extended to the primary finder Q1. Thereupon operate lead OL which is connected to the units lead UI is extended to the windings of the prepare magnets of the primary finders and also to hold magnet HMQ1. Earth is connected at instant A of a cycle to lead UI and thus causes the operation of prepare magnet PMA and hold magnet HMQ1. Magnet HMQ1 in operating performs similar switching operations as HMP1 described above. The calling line 1A is thus extended over primary finder Q1, secondary finder Q*p*, RF*b* to RE*b*.

In the above description it was explained that earth is connected to lead TL1F1 at consecutive instants in a cycle by the operation of a single primary finder hold magnet. Thus, for instance, earth is connected to TL1F1 at instants P*b*, P*q* and P*x* in a cycle if hold magnet HMP1 of the primary finder P1 is operated, thus indicating that the primary finder P1 is unavailable. As regards the secondary finders, however, earth is connected to lead TL2F at one instant only if a secondary finder hold magnet is operated. Thus if hold magnet HMP*p* is operated earth is connected to lead TL2F only at instant P*p*. The connection of earth to lead TL2F is necessary at this instant since the secondary finder may be in use on any of the sets of contacts with which the hold magnets HMP*p*—HMX*x* are associated. For instance, assume a call has been set up from line A1 over primary finder PA and secondary finder P*p*. When subscriber 11 sets up a call, primary finder P1 will test idle but the operation of the test relay in the relay equipment, say RE*a*, will be prevented by earth at instant P*p* on lead TL2F. No earth will be applied either to leads TL1F or TL2F at instant P*q* in the cycle so that the connection from subscriber 11 will be extended over primary finder P1 and secondary finder P*q*.

Consideration will now be given to the occurrence of simultaneous calls from two subscribers and it will first be assumed that the two subscribers are in the same group, say 11 and 1A. Since A and 1 are adjacent instants in two cycles it will usually be the case that the calls will be initiated after instant 1 and before instant A in a cycle. Line relays L11 and L1A will operate substantially simultaneously but since instant A will occur before instant 1 of the next cycle, the circuits for extending line 1A will usually be effective before those for line 11. Thus line 1A will be extended at instant A to TE*a* and RE*a* by the operation of PMTR1 and HMTR*a* while line 11 will be extended at instant 1 of the next cycle to TR*b* and RE*b* by the operation of PMTR1 and HMTR*b*. Route finding will now be effected by RE*a* and RE*b* and it will be understood that the operation of RE*a* and RE*b* will not be simultaneous but consecutive. This is effected by arranging for a chain circuit including contacts of the hold magnets of the tens register and contacts of the switch through relays of each impulse responder. If the route finding of RE*a* is initiated at instant X when RE*a* will have preference and as soon as ST*a* operates, battery will be supplied via XB to RE*b* if instant X has not expired. If, however, instant X expires before RE*a* has found an available route then battery will be applied to YB and RE*b* will start route finding, battery however being always available to any responder as long as no responder is seeking for an available route. The order in which testing takes place is immaterial and in general indeterminate. It can be said that RE*a* or RE*b* operates first according as to which of the test leads CTL*a* or CTL*b* nearest to the lead to which battery is next connected. In the present instance it will be assumed that RE*a* will test first, followed by RE*b*. Assuming no primary or secondary finders are in use at this time, RE*a* will find the primary finder P1 and the secondary finder P*p* both available and relay T*a* will operate and over operate leads OLRF and OL2F will cause the operation of the prepare and hold magnets to extend the connection from line 1A over P1, P*p* and RF*a* to RE*a* as described above. Then testing will be effected by RE*b* and since P1 and P*p* are now unavailable the connection from line 11 will extend over Q1, Q*p*, RF*b* to RE*b*. As the tens digit is the same, it is not possible to distinguish between the two calls until the units digit is made effective and as this takes place at different instants in a cycle it is not certain which connection will be completed first. The same units lead UI is available to both but if line 11 is selected first then RE*a* will be connected to line 11 and RE*b* to line 1A after the cut off relay of line 11 has broken the connection from UN11 to UI.

It will now be assumed that the two simultaneously calling lines are in different groups, for instance, 11 and A1. The line relays L11 and AA1 operate substantially simultaneously and prepare circuits for the prepare magnets PMTR1 and PMTRA respectively. Again since instants A and 1 are consecutive, it will be usual for instant A to be effective after the initiation of the calls rather than instant 1. At instant A therefore prepare magnet PMTRA will operate followed by hold magnet HMTRA and relay equipment RE*a* will be taken into use over TR*a*. At instant 1 of the next cycle, prepare magnet PMTR1 will operate followed by hold magnet HMTRB and relay equipment RE*b* will be taken into use over TR*b*. Route finding will now be effected by RE*a* and RE*b*, but it will be understood that testing will not be simultaneous but consecutive as before, the determination as to which equipment operates first being effected by the instant in the cycle X, Y and Z at which they are taken into use as previously described.

Assuming RE*a* tests first, primary finder PA and secondary finder P*p* will both be found available and the connection from the line 1A will be set up over these finders and RF*a* to RE*a* as previously described. When RE*b* tests, the secondary finder P*p* will test busy but P*q* will be available. The connection will thus be extended from line 11 over P1, P*q* and RF*b* to RE*b*.

It will of course be understood that many other different examples could be given of the setting up of connections from any line of the groups shown but it is believed that sufficient have been described to enable the principles of the invention to be understood.

I claim:

1. A switching arrangement for telecommunication systems comprising a plurality of lines, primary finder switches and secondary finder switches for connecting a calling one of said lines to an idle inlet of a secondary finder and a control equipment seizable independently of said finder switches when idle by a line initiating a call and comprising identifying means to establish the identity of the calling line, testing means having simultaneous access to primary and secondary finder switches which under control of the identifying means selects in one operation a complete path including an idle primary finder and an idle secondary finder by which the calling line can be connected to an idle inlet of a secondary finder switch and operating means for operating the primary and secondary finders in the selected path controlled thereafter jointly and simultaneously by said testing means and said identifying means to complete a connection to the selected idle inlet.

2. A switching arrangement for telecommunication systems comprising a plurality of lines, primary finder crossbar switches and secondary finder crossbar switches for connecting a calling one of said lines to an idle inlet of a secondary finder and a control equipment seizable when idle by a line initiating a call and comprising identifying means to establish the identity of the calling line, testing means including test leads extending from the control equipment to the bridges of said crossbar switches so as to give simultaneous access thereto which testing means under control of the identifying means select in one operation a complete path including an idle primary finder and an idle secondary finder by which the calling line may be connected to an idle inlet of a secondary finder and operating means for operating the primary and secondary finder in the selected path controlled thereafter jointly and simultaneously by said testing means and said identifying means to complete the connection to the selected idle inlet.

3. In an automatic telecommunication system a plurality of lines, finder switches in at least two switching stages having access to said lines, a route finder switch having access to the inlets of the last stage finder switch control circuits each connected to a different route finder and call responding means seizable by a calling line independent of said finder switches and said route finder and incorporating testing means having simultaneous access to the finder switches of each stage by which the idle or busy condition of the finder switches of the various switching stages giving access to the calling line are tested over circuits independent of the route finder switch and selective operating circuits thereafter controlled simultaneously by said testing means to effect the selective operation of a finder switch of each stage and a route finder to connect a free control circuit with the calling line.

4. In an automatic telecommunication system, a plurality of lines, a first finder crossbar switch having its individual outlets connected to said lines, a second finder crossbar switch having its individual outlets connected to the bridges of common inlets of said first finder switch, a third crossbar switch a plurality of link circuits connecting bridges of common inlets of said second finder switch to sets of contacts extending along one coordinate of said third crossbar switch, a plurality of control circuits less in number than the number of said link circuits and connected to sets of contacts extending along another coordinate of said third crossbar switch, selecting means for associating an idle control circuit with a calling line independently of said finder crossbar switches and call responding means including line identifying means, testing means controlled by call responding means after said selecting means have associated an idle control circuit with a calling line for testing the idle or busy condition of all bridges of the first and second crossbar switches which serve to connect the calling line to the idle control circuit selected by said selecting means, and selective operating circuits controlled by said testing means and said line identifying means jointly to operate the select magnets and hold magnets of said crossbar switches to establish a connection from said calling line through selected bridges of each of said first and second crossbar switches to an idle link circuit and thence via the third crossbar switch to the selected idle control circuit.

5. In an automatic telecommunication system, a plurality of lines, a first finder crossbar switch having its individual outlets connected to said lines, a second finder crossbar switch having its individual outlets connected to the bridges of common inlets of said first finder switch, a third crossbar switch, a plurality of link circuits connecting bridges of common inlets of said second finder switch to contacts of said third crossbar switch, a plurality of control circuits less in number than the number of said link circuits and connected to bridges of common inlets of said third crossbar switch, selecting means for selecting an idle control circuit for use by a calling line independently of said finder crossbar switches, call responding means including line identifying means, testing means including test leads extending to said finder switches independently of said return crossbar switch controlled by call responding means after said selecting means have associated an idle control circuit with a calling line for testing the idle or busy condition of all bridges of the first and second crossbar switches which give access to the calling line, and selective operating circuits controlled by said testing means and said call responding means jointly to operate the select magnets and hold magnets of said crossbar switches to establish a connection from said calling line through selected bridges of each of said first and second crossbar switches to an idle link circuit and via the third crossbar switch to the idle control circuit determined by said selecting means.

6. In an automatic telecommunication system, a plurality of lines, a first finder crossbar switch having its individual outlets connected to said lines, a second finder crossbar switch having its individual outlets connected to the bridges of common inlets of said first finder switch, a third crossbar switch, a plurality of link circuits connecting bridges of common inlets of said second finder switch to contacts of said third crossbar switch, a plurality of control circuits including impulse responding equipment less in number than the number of said link circuits and connected to bridges of said third crossbar switch, selecting means for selecting an idle control circuit for use by a calling line independently of said finder crossbar switches and call responding means including line identifying means, testing means including leads extending to said finder switches independently of said third crossbar switch controlled by call responding means after said selecting means have associated an idle control circuit with the calling line for testing the idle or busy condition of all bridges of the first and second crossbar switches which give access to the calling line, and selective operating circuits controlled by said testing means and said call responding means jointly to operate the select magnets and hold magnets of said crossbar switches to establish a connection from said calling line through selected bridges of each of said first and second crossbar switches to an idle link circuit and via the third crossbar switch to the idle control circuit determined by said selecting means.

7. In an automatic telecommunication system, a plurality of lines, a plurality of impulse responding equipments, crossbar switches in at least two switching stages to connect an idle one of said impulse responding equipments to a calling line, route finder switches having access to a plurality of the last stage crossbar switches, control circuits each connected to a different route finder switch and call responding means seizable by a calling line independent of said crossbar switches and of said route finder switches and incorporating calling line identifying means, testing means including test leads extending directly to each hold magnet of said crossbar switches and on which leads the idle or busy condition of those bridges controlled by the hold magnets of the crossbar switches at each stage which serve to connect the calling line to an idle one of said impulse responding equipments are tested simultaneously and selective operating circuits controlled thereafter jointly by said calling line identifying means and by said testing means to effect simultaneous selective operation of a crossbar switch of each stage to connect a free impulse responding equipment with the calling line.

8. In an automatic telecommunication system, a plurality of lines, finder switches in at least two switching stages having access to said lines, route finder switches having access to a plurality of the last stage finder switches, control circuits each including an impulse responding equipment and each connected to a different route finder switch and call responding means seizable by a calling line independent of said finder switches and of said route finder switches and incorporating calling line identifying means, testing means including test leads extending directly to each finder switch by which the idle or busy condition of the finder switches of each stage which serve to connect the calling line to an idle one of said impulse responding equipments are tested simultaneously and selective operating circuits controlled thereafter jointly by said calling line identifying means and by said testing means to effect simultaneous selective operation of a finder switch of each stage and the route finder to which the control circuit is connected to connect a free impulse responding equipment with the calling line.

9. In an automatic telecommunication system, a plurality of lines, finder switches in at least two switching stages having access to said lines, route finder switches having access to a plurality of the last stage finders, control circuits each connected to a different route finder switch and call responding means seizable by a calling line to select an idle one of said control circuits for use by the calling line independently of said finder switches and of said route finder switches and incorporating calling line identifying means, testing means including test leads extending directly to each of said finder switches by which the idle or busy condition of the finder switches of each stage which serve to connect the calling line to an idle one of said impulse responding equipments are tested simultaneously and selective operating circuits controlled thereafter jointly by said calling line identifying means and by said testing means to effect simultaneous selective operation of the finder switch of each stage and the route finder to which the control circuit is connected to connect the control circuit with the calling line.

References Cited in the file of this patent

UNITED STATES PATENTS

| | | |
|---|---|---|
| 2,582,959 | Bruce et al. | Jan. 22, 1952 |
| 2,597,007 | Kruithof et al. | May 20, 1952 |